United States Patent [19]

Greskovich et al.

[11] Patent Number: 4,495,874

[45] Date of Patent: Jan. 29, 1985

[54] COMBUSTION OF HIGH ASH COALS

[75] Inventors: Eugene J. Greskovich, Allentown; Walter A. Zanchuk, Walnutport, both of Pa.

[73] Assignee: Air Products and Chemicals, Inc., Allentown, Pa.

[21] Appl. No.: 495,868

[22] Filed: May 18, 1983

[51] Int. Cl.³ .............................................. F23D 1/00
[52] U.S. Cl. ..................... 110/347; 110/261; 110/263; 110/265; 110/342; 122/22
[58] Field of Search ............... 110/260, 261, 262, 263, 110/265, 341, 342, 347, 348; 122/22, 211, 479 R; 431/4, 10; 48/210

[56] References Cited

U.S. PATENT DOCUMENTS

| | | | |
|---|---|---|---|
| 3,699,903 | 10/1972 | King | 110/347 |
| 4,253,403 | 3/1981 | Vatsky | 110/260 |
| 4,263,856 | 4/1981 | Rickard | 110/261 |
| 4,367,686 | 1/1983 | Adrian | 110/263 |

Primary Examiner—Edward G. Favors
Assistant Examiner—Steven E. Warner
Attorney, Agent, or Firm—Michael Leach; E. Eugene Innis; James C. Simmons

[57] ABSTRACT

A method is described for burning pulverized high ash coal in a furnace firebox and reducing ash fines which comprises
(a) injecting a primary airstream containing a pulverized coal which is at least 7 wt % ash and a secondary airstream into the flame zone of a furnace firebox and combusting the coal to yield a flame of combustion, and
(b) injecting a sufficient amount of oxygen into the flame zone via the secondary airstream such that the oxygen concentration of the combined primary and secondary airstreams is between 21 to about 28 vol %.

In a preferred embodiment, the oxygen enrichment addition is proportioned between the primary and the secondary air streams.

15 Claims, 4 Drawing Figures

COMBUSTION OF HIGH ASH COALS

FIELD OF THE INVENTION

The invention relates to a process for the combustion of pulverized coal in a furnace firebox. More particularly, the invention relates to combusting pulverized coal which is fed into the furnace firebox with a primary airstream while also supplied with a secondary airstream.

BACKGROUND OF THE INVENTION

It has been traditional to burn coal in the presence of excess air to generate heat that can be used directly or indirectly for the purpose of providing steam energy demands. This steam is subsequently used in industrial boilers to provide heat or in utility boilers to generate electricity. It is well known that the amount of excess air is carefully controlled, not only for combustion-zone purposes, but also to maximize the residence time and heat transfer coefficient in the convective zone of the furnace. Therefore, under these conditions, oxygen partial pressure is primarily maintained by controlling the excess air flow rate which at times can be beneficial in the combustion zone, but detrimental elsewhere within the furnace.

One type of furnace used for combusting pulverized coal comprises a furnace firebox having a primary air source and a secondary air source which provide at least a sufficient amount of air for the complete combustion of the coal. The pulverized coal is fed into the firebox suspended in the primary airstream. Typically, a nozzle having concentric cylindrical passageways is the means for injecting the primary and secondary airstreams. The primary airstream containing suspended pulverized coal is fed through the central passageway of the nozzle while the secondary airstream is injected through the surrounding, or annular, passageway.

When coal having an ash content of less than about 6 wt. % is burned in such fireboxes, the fireball is usually compact and relatively well defined. However, when the ash content of the coal increases above 7 wt. %, the fireball begins to spread out, becoming more diffuse as the ash content increases because the higher ash coals require more excess air to burn properly and also burn more slowly. As a result, less radiative heat is generated for the same amount of coal fed into the furnace leading to severe derating of the steam capacity of the furnace. Further, the higher ash content means increased slagging in the firebox and also increased fouling of the tubes in the convective superheater sections due to higher ash emissions of particles less than about 1 micron in size.

U.S. Pat. No. 2,865,344 discloses adding oxygen to recycled combustion gases as a replacement for some of the air injected into the furnace in order to decrease stack heat losses and to better control furnace temperatures.

U.S. Pat. No. 3,628,322 discloses delivering oxygen to a gas producer to gasify coal in order to produce fuel which is then delivered with more oxygen to a boiler furnace to generate steam.

U.S. Pat. No. 3,699,903 discloses a method in which oxygen is used alone, preferably in stoichiometric quantities, as the secondary or combustion gas, and with only enough primary air for fuel feed, adequate gas velocities, and fuel turbulence and distribution in the furnace firebox.

U.S. Pat. No. 4,052,138 discloses a method of firing coal-powered boilers to produce both heat to operate the boiler and also to produce a usable fuel gas. The method consists of burning pulverized coal in the presence of varying proportions of steam and oxygen. The boiler is over-fired with coal, but with an undersupply of oxygen, in order that the total available heat content of the coal is divided between heat released by the incomplete combustion of the coal and heat content contained in combustible flue gases.

U.S. Pat. No. 4,261,167 discloses gasifying a carbonaceous fuel at relatively high pressure and temperature by partial oxidation with oxygen to produce a fuel gas, the fuel gas from the partial oxidation reaction is expanded to a lower pressure in a turbine and, after removal of undesirable compounds, is supplied to a steam boiler for the production of power.

U.S. Pat. No. 4,329,932 discloses a method of burning fuel with lowered emission of nitrogen oxides which comprises feeding pulverized fuel to the main burner in a combustion furnace and additionally feeding pulverized fuel to the region of the furnace where the first fuel is about to conclude its combustion, using inert gas with or without a low oxygen content as a conveying fluid, while supplying oxygen or air to a region downstream of the region for fuel addition.

B. Ghosh, et al., Ind. Eng. Chem., 47, 117–121 (1955) discuss the effect of oxygen enrichment on the ignition time of pulverized coal.

Other literature articles relating to oxygen enrichment of pulverized coal include:

A. Ivernel, Proc. Combustion Inst. European Symp. 1973, 463–468;

B. Ghosh, et al., 6th Symposium on Combustion, 595–601 (1957);

R. P. Weight, J. Inst. Energy, 54, 176 (1981); and S. Bandyopadhyay, et al., Combustion and Flame, 18, 411–415 (1972).

SUMMARY OF THE INVENTION

The present invention relates to a method for combusting pulverized coal, particularly high ash pulverized bituminous coal, with oxygen enriched air in a furnace firebox which contains means for supplying a primary airstream containing pulverized coal and a secondary airstream into the firebox. The method for combusting high ash content coal comprises (a) feeding a pulverized coal which is at least 7 wt. % ash, preferably at least 10 wt % ash, into the furnace firebox with the primary airstream to yield a flame of combustion, and (b) adding a sufficient amount of oxygen into the secondary airstream, preferably into the primary airstream and the secondary airstream, such that the oxygen concentration of the air in the flame zone when the primary and secondary airstreams converge with the coal is between 21 and 28 volume percent.

Desirably, the oxygen enrichment addition to the secondary airstream is accomplished with the injection of the secondary airstream being substantially adjacent to the external boundary of the flame of combustion.

In a preferred embodiment of the invention, from greater than 1 to about 7 vol. % oxygen enrichment is added to the air injected into the firebox divided between the primary air and secondary air with the secondary air containing at least 1 vol. % oxygen enrichment. Preferably, the oxygen enrichment is divided equally between the primary and secondary airstreams.

"Volume % oxygen enrichment" means that volume percent added to 21 vol. %; for example, 1 vol. % oxygen enrichment means that amount of oxygen addition which yields air having an oxygen content of 22 vol. %.

Oxygen enrichments within the greater than 0 to about 7 vol. % range of the invention (yielding oxygen concentration between 21 and 28 vol. % in the air) should be increased as the ash content of the coal increases; in other words, when the ash content is about 7 to 10 percent, oxygen enrichments of 1 to 2 vol. % are suitable, whereas, ash contents of 15 to 20 wt. % would require up to 7 vol. % oxygen enrichment.

An advantage of the method of the invention is a significant reduction in ash fines less than 1 micron in diameter which results in a decrease in the fouling of the superheater and boiler bank water tubes and a reduction in boiler downtime to clean the fouled tubes.

As another advantage of the invention, the process provides improved hydrodynamics in the firebox and increased radiant heat transfer albeit at the expense of some convective transfer.

In addition, a better balance between radiative heat and convective heat transfer can be achieved, especially in a derated boiler due to high ash in the coals.

As a further advantage, oxygen enrichment of the combustion air in both the primary and secondary air sources significantly reduces the NO content of the flue gas.

DETAILED DESCRIPTION OF THE INVENTION

Figure 1:
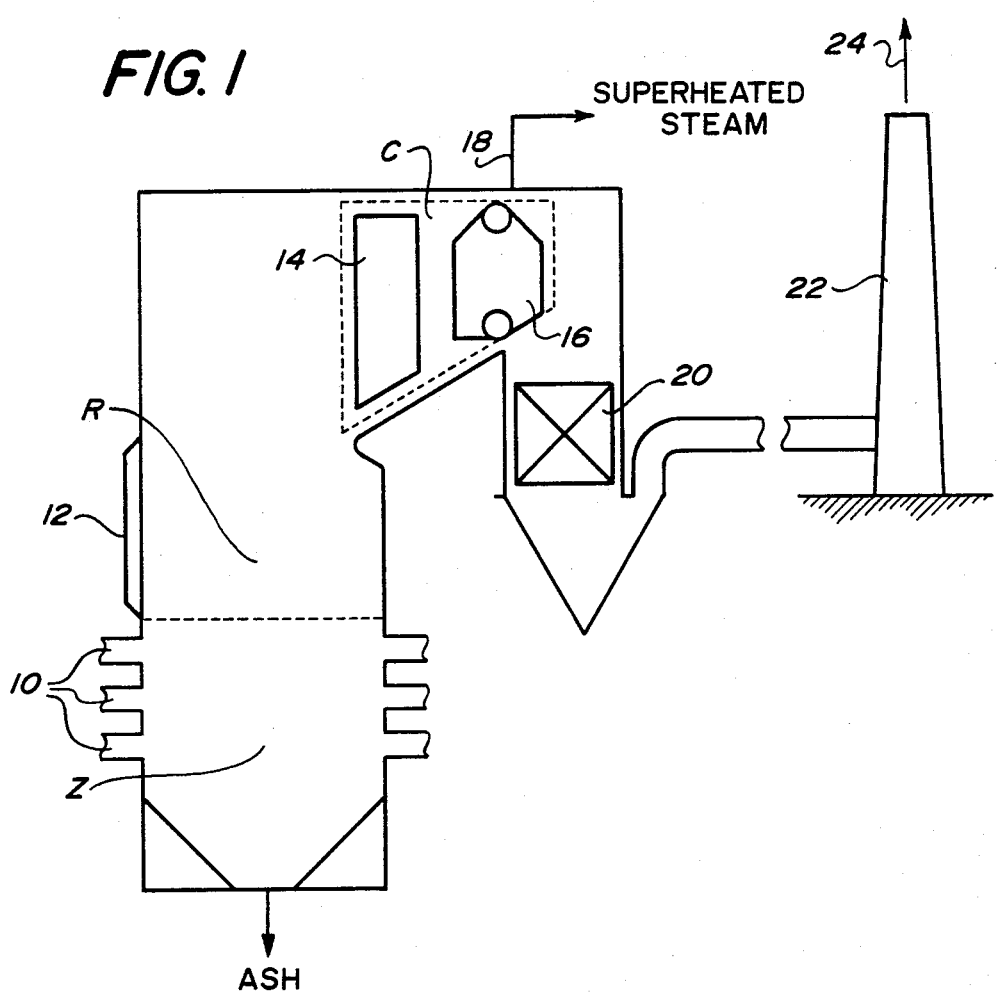
FIG. 1 is a schematic illustration of a conventional utility boiler or steam generator having a firebox section where fuel is combusted and overhead sections for radiant and convective heat transfer.
Figure 2:
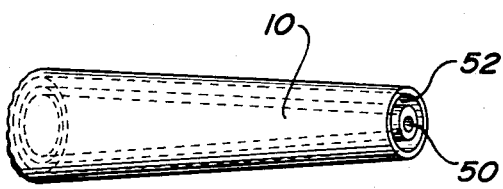
FIG. 2 is a drawing of a typical burner nozzle used to inject fuel and oxidant into the furnace of FIG. 1.

A typical utility boiler for generating steam is depicted in FIG. 1. Fuel such as pulverized coal is forced through one or more injection nozzles 10 into the furnace firebox combustion zone Z. The pulverized coal is "blown" through the nozzles with sufficient primary air to deliver the coal at a prescribed rate. Normally, additional air over and above this amount is necessary to maintain optimal combustion conditions. This secondary air source is generally added through the injection nozzles as depicted in FIG. 2. The primary air normally conveys the fuel in cylindrical passage 50 of nozzle 10 while the secondary air by itself flows through the annular passage 52. It is possible to add additional air to zone Z by other means for a variety of control purposes.

As shown in FIG. 1, fuel and air are combusted in combustion zone Z whereby radiant heat transfer occurs between the hot combustion gases and water flowing in vertical tubes, or waterwalls, 12 at the furnace wall around the firebox circumference in the general radiative region R. The tubes 12 are connected in the conventional manner to the tubes of boiler bank 14 and superheater 16 in which convective heat transfer between the hot combustion gases and water/steam takes place in the general convective region C to finally produce superheated steam 18 which is subsequently used in a turbine, not shown, to produce electrical energy. The spent combustion gases pass from convective heat transfer region C through economizer section 20 and ultimately through stack 22 to be discharged to the atmosphere at 24.

Typically, when bituminous coal containing low ash contents, i.e., less than about 7 wt. % and particularly less than about 5 wt %, are burned, a relatively dense, well-defined fireball, or flame of combustion, is observed in combustion zone Z and very efficient radiative and convective heat transport takes place in zones R and C, respectively. Under these "normal" conditions, the boiler delivers the designed steam output to the power plant. However, when the furnace is fired with high ash bituminous coal of greater than 7 wt. % ash, particularly greater than 10 wt % ash, the amount of coal conveyed through nozzle 10 and fired in combustion zone Z to produce the same steaming rate as designed for low ash coal is sizably increased. In addition, the amount of air required to convey the pulverized coal through the primary air bore 50 is also increased. The effect of this situation on a boiler designed for low ash bituminous coal can be very harmful since the fireball is now much more diffuse, extending not only in section R, but up, through and into section C. Since it is more diffuse, the fireball is less radiative to waterwalls 12. Because there is more ash in the hot combustion gases, slagging on the furnace walls and fouling of water tubes in superheater 16 and boiler bank 14 seriously reduce heat transfer rates. Also the formation of clinkers dropping into the furnace bottom can lead to shutdown. The ultimate result is a derating in the steaming rate of the boiler up to 25 percent for boilers originally designed for low ash coals. For newly designed boilers for high ash bituminous coals, it can lead to unusually higher capital costs.

The problems of less radiative heat transfer to waterwalls, slagging on the furnace walls and fouling of water tubes in the convective region of the furnace associated with the combustion of high ash coals can be alleviated by judiciously using small amounts of oxygen enrichment made via the secondary air supply.

According to the present invention, the fuel injected into firebox combustion zone Z is pulverized bituminous coal containing greater than about 7 to about 20 wt. % ash, preferably 10–20 wt. % ash. The rate at which air is passed through the cylindrical bore 50 and annular cylinder 52 of nozzle 10 is adjusted to be in excess over that theoretically required for complete combustion. For example, if one pound per hour of pulverized coal were fed into the firebox combustion zone Z, the total air flow rate would be about 2.33 ft.$^3$/hr. proportioned 0.80 ft.$^3$/hr. as the primary airstream through bore 50 and 1.53 ft.$^3$/hr. as the secondary airstream through annular space 52.

An addition of between 0 to 7 vol. % oxygen enrichment, preferably of commercially pure oxygen is made to the air so that the total air injected into the firebox combustion zone has an oxygen partial pressure of between 21–28 vol. %, i.e. greater than 21 to about 28 vol. %. The oxygen enrichment addition may be made entirely in the secondary air or in both the primary and secondary air provided at least 1 vol. % oxygen enrichment is added via the secondary air. Oxygen enrichment above 7 vol. % offers little if any additional benefit because of undesirably high temperatures within the furnace and their effect on ash slagging and furnace internals.

Such oxygen enrichment markedly changed the characteristics of the coal fired flame when burning high ash bituminous coals. Under these conditions, it was found that unexpected benefits in both radiant and convective heat transfer accrue, not due to just the thermodynamic factors such as increases in adiabatic flame temperature or flame kinetic factors such as increased burning rates, but due also to alterations and changes in flame hydrodynamics and subsequent gas irreversibilities caused by the combustion of high ash coals. These findings will be described in more detail by the following examples.

EXAMPLE 1

Upper Freeport bituminous coal (about 80 percent minus 200 mesh; 17.8 wt. % ash) was fired in a 10-foot long vertical downflow combustor having six thermocouples positioned throughout the length of the vertical wall. The feed nozzle at the top of the combustor comprised a bore for conveying the primary air and pulverized coal and means space for supplying the secondary air in a premix fashion prior to combustion. Oxygen was added to this premix of pulverized coal, primary air and secondary air. In the runs of this example, coal was fired at the rate of 15 lb./hr. and 10% excess air injected at the rate of 12 ft.$^3$/hr. as primary air and 23 ft.$^3$/hr. as secondary air. The total air flow for all runs was held constant. The first run was a control run in which no oxygen addition was made. Runs 2 and 3 involved the addition of oxygen equally to the primary and the secondary combustion air at levels of 1 vol. % and 2 vol. % oxygen enrichment, respectively.

Figure 3:
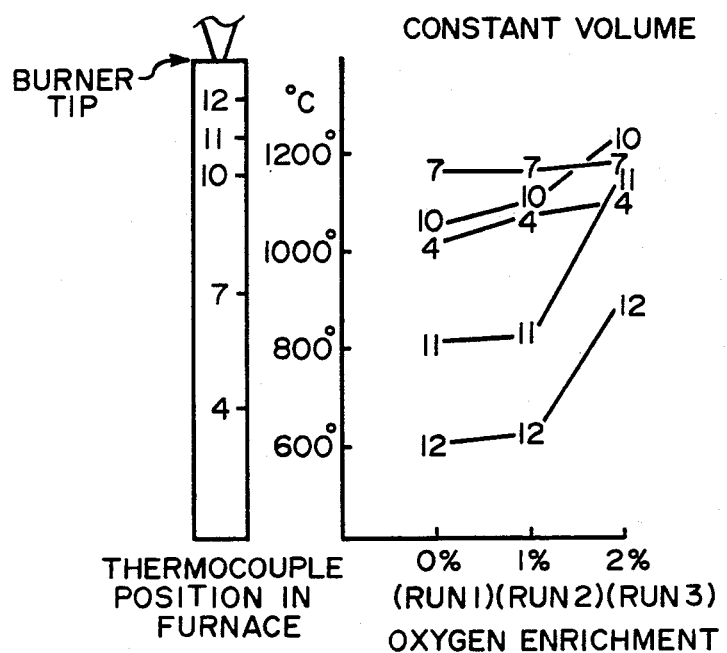
FIG. 3 graphically illustrates the retraction of the combustion flame in high ash, coal-fired burners as a result of oxygen enrichment.

The graph in FIG. 3 shows the temperatures measured by the respective wall thermocouples in each of the three runs. It can be seen that unusual temperature increases occurred closer to the burner tip as oxygen enrichment was increased up to 2 vol. %. That is to say, when these low level oxygen enrichments were added equally to primary and secondary combustion air, the retraction of the flame closer to the nozzle was unexpectedly greater than calculated from flame kinetics theory. The effect of oxygen enrichment is very pronounced, far more than one would expect from a simple increase of oxygen partial pressure from coal combustion kinetics theory or decrease in flue gas volume.

Although the temperatures obtained in this example were somewhat low indicating incomplete combustion, these experiments do demonstrate the benefit of oxygen enrichment on flame retraction. Thus, within the firebox combustion zone Z, the coal-fired flames for high ash coals can be brought under control and made more radiative by small amounts of oxygen addition.

EXAMPLE 2

A commercial, horizontally fired, pulverized coal experimental burner rated at about 3 million BTU/hr. was used to combust the same coal as was used in Example 1.

TABLE 1

| SERIES | TEST NO. | MASS FLOWS (LB/HR) | | | | FUEL | $O_2$ CONC. IN FLAME ZONE (% BY VOL.) | FURNACE HEAT ADSORPTION IN RADIANT SECTION (% HEAT INPUT) | GASEOUS EMMISSIONS (LBS/$10^6$ BTU) | |
|---|---|---|---|---|---|---|---|---|---|---|
| | | PRIM. AIR | SEC. AIR | $O_2$ | LOCATION | | | | NO | CO |
| 1 | 1 | 400 | 1664 | — | — | 199.2 | 21 | 41.8 | — | — |
|   | 2 | 417 | 1618 | 63.0 | Prim. + Sec. | 215.6 | 23 | 46.2 | 1.08 | 0.133 |
|   | 3 | 408 | 1165 | 110.9 | Prim. + Sec. | 196.8 | 25 | 47.6 | 0.81 | 0.083 |
| 2 | 4 | 403 | 1711 | — | — | 206.5 | 21 | 43.7 | 1.05 | 0.163 |
|   | 5 | 412 | 1491 | 44.9 | Prim. | 199.7 | 23 | 46.3 | 1.10 | 0.144 |
|   | 6 | 401 | 1287 | 80.6 | Prim. | 197.4 | 25 | 46.2 | 0.83 | 0.112 |
| 3 | 7 | 401 | 1707 | — | — | 206.5 | 21 | 43.5 | 0.99 | 0.161 |
|   | 8 | 384 | 1516 | 43.0 | Sec. | 201.8 | 23 | 45.3 | 1.03 | 0.149 |
|   | 9 | 398 | 1293 | 83.0 | Sec. | 198.0 | 25 | 47.6 | 1.12 | 0.134 |

The results of nine tests as summarized in Table 1 indicate an increase in radiant heat recovery of approximately 5-15%. Related to a commercial utility boiler burning high ash coal, this example confirms that oxygen enrichment in the primary air, secondary air, or both, will make the flame more radiant for high ash coals and permit higher heat fluxes to waterwalls of the furnace firebox.

The importance of the location of the oxygen addition is demonstrated in the following Examples:

EXAMPLE 3

Using the same experimental burner and conditions described in Example 2, the resulting ash particle size distribution in the combustion gases was measured. The particle number density was determined using an Electric Aerosol Analyzer.

Figure 4:
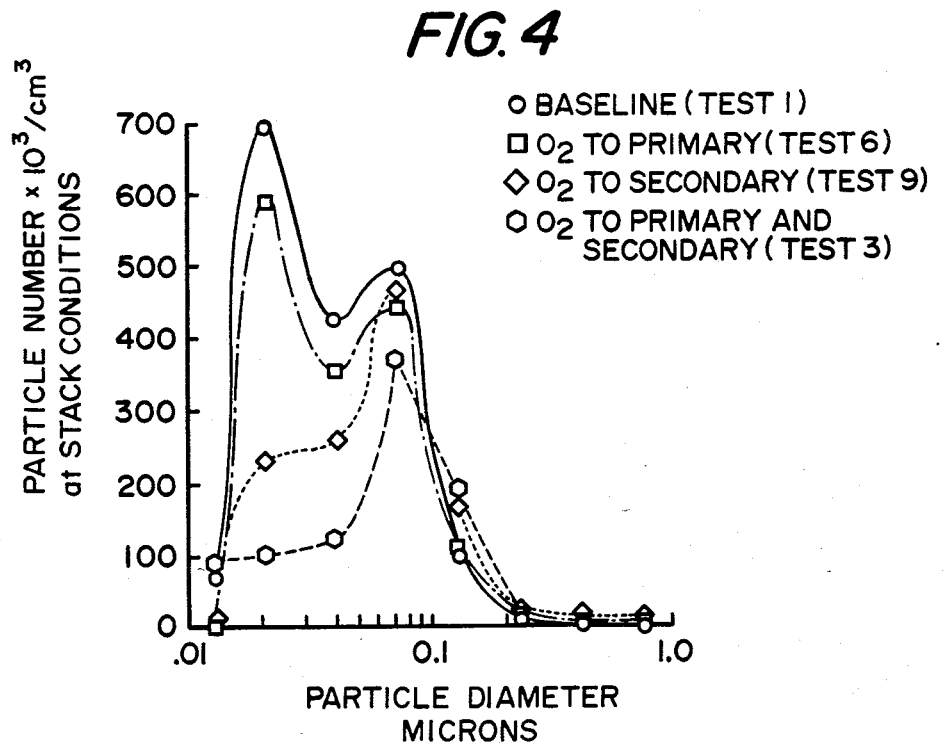
FIG. 4 graphically illustrates the reduction in ash fines less than 1 micron in diameter as a result of oxygen enrichment.

It was found that the ash particle size distribution as plotted in FIG. 4 was positively affected by the oxygen addition and, particularly, was dependent on the location of such oxygen addition. For example, when oxygen enrichments of 4 vol. % were added to primary air, only a slight difference was observed between ash sizes in the base experiment using only air. However, when oxygen enrichment of 4 vol. % were added to the secondary air and equally to the primary air and secondary air, a marked reduction up to 60 percent in ash fines under 1 micron in diameter resulted compared to the basic experiment with only air. Ash particles in the range of 0.01 to 0.1 microns appeared to be most affected by the oxygen enrichment.

In a commercial utility boiler such as depicted in FIG. 1, the beneficial effects of oxygen enrichment would be achieved not only in combustion zone Z and radiative zone R, but also in convective zone C since significant reduction in ash fines under 1 micron would lead to reduced fouling of water tubes composing the superheater and boiler bank. Overall, this would increase convective heat transfer along with the increase in radiative transfer. In addition, the frequency of cleaning and/or removing tubes in the convective section due to severe fouling is also significantly reduced.

EXAMPLE 4

Using the same experimental burner and conditions described in Example 2, gas species such as NO and CO in the resulting flue gas were measured.

The data show that oxygen enrichments up to 4 vol. % had a strong impact on the level of NO and CO in the flue gas. For example, as oxygen enrichment increased, the amount of CO was reduced independent of where the oxygen was added. At 2 percent enrichment, the CO in the flue gas was reduced by approximately 10–15 percent and at 4 percent enrichment, it was reduced by as much as 50 percent.

Similarly, as oxygen enrichment was increased up to 4 vol. %, the NO in the resulting flue gas markedly changed and was dependent on the location of the oxygen addition. Oxygen added to the primary air or equally to the primary or secondary air initially increased NO content at about 2% enrichment but sharply decreased the amount of NO in the flue gas at the higher enrichments. For example, at 4 percent enrichment, NO was decreased by about 18–21 percent. However, there was no resulting NO decrease when oxygen enrichment was added only to the secondary air. In fact, there was an increase in NO concentration of about 12 percent.

The foregoing examples demonstrate that oxygen enrichments up to 4 vol. % of air recaptures capacity in coal-fired utility boilers originally designed for low ash coals, but currently using high ash coals. The benefits derived from oxygen enrichment are not solely due to increases in flame temperature and coal particle reaction rates, but are primarily due to improving hydrodynamics of the massive fireball, thus making it more radiative by improving the radiative "view factor" between the fireball and the waterwall. In addition, the location of the oxygen enrichment with regard to the primary air and secondary air yielded significant improvements in heat transfer coefficient and control of gaseous and fine particulate species. Since most of the reserves of low ash bituminous coals are being depleted in the U.S., the use of higher and higher ash bituminous coals for firing boilers will become more prominent with time.

In all the examples except Example 4 for NO control, it was unexpectedly found that adding oxygen to the secondary air had a significant positive effect on the overall boiler efficiency (primarily radiant), the overall heat transfer coefficient ($h_c + h_r$) and reduction of ash fines. Additionally, when oxygen enrichment was added equally to both the primary air and secondary air, a similar result for all these parameters was obtained indicating the prominent role for at least some portion of oxygen addition to the secondary air, if not all of it. Only for the case of NO control was oxygen enrichment of only the secondary air not preferred; however, once some portion of the enrichment was added to the primary air, there was a marked reduction in NO formation. It should be noted that oxygen enrichment of only the secondary air yielded only a slight and not a pronounced increase in NO formation.

From the above data, it can be seen that the air provided to the flame zone to support the combustion of the coal should contain a sufficient quantity of oxygen to yield an oxygen concentration between 21 and 28 vol. % and that oxygen enrichment around the outside circumference of the flame or fireball as provided via the secondary air is very important, perhaps the most crucial factor, in achieving the unexpected results. Accordingly, the addition of oxygen to combustion air in a furnace firebox in any manner external and substantially adjacent to the flame will also reap the benefits described for the method of this invention. Therefore, alternate methods of secondary air injection into the firebox such as a secondary air nozzle located in the floor of the firebox directing secondary air at a 90° angle to the primary airstream is also within the scope of the invention.

STATEMENT OF INDUSTRIAL APPLICATION

The invention provides a method for increasing the steaming rate of a derated coal-fired utility boiler combusting pulverized high ash content coal while also significantly reducing the fine ash particulate matter which causes steam/water tube fouling.

What is claimed is:

1. A method for combusting high ash content coal in a furnace comprising a firebox and at least one injection nozzle having a bore for a primary airstream and an annular passage for a secondary airstream, the nozzle communicating with the firebox, which method comprises:
    (a) injecting a primary airstream containing a pulverized coal which is at least 7 wt % ash and a secondary airstream through the injection nozzle into the flame zone of the furnace firebox and combusting the coal to yield a flame of combustion, and
    (b) injecting a sufficient amount of oxygen into the secondary airstream such that an oxygen enriched secondary airstream emanates from the injection nozzle and the oxygen concentration of the combined primary and secondary air streams is 22 to 25 vol %, whereby the amount of ash fines less than one micron in diameter is reduced.

2. The method of claim 1 in which the ash content of the pulverized coal is at least 10 wt %.

3. The method of claim 1 in which the oxygen is added to both the primary and secondary airstreams so that oxygen enriched primary and secondary airstreams emanate from the injection nozzle.

4. The method of claim 3 in which the oxygen enriched secondary airstream contains an amount of oxygen sufficient to provide an oxygen concentration of at least 22 vol % in the combined primary and secondary airstreams.

5. In a process for combusting pulverized coal in a furnace comprising a firebox and at least one injection nozle having a bore for a primary airstream and an annular passage for a secondary airstream, the nozzle in communication with the firebox, which process comprises feeding the pulverized coal into the firebox in a primary air stream and injecting a secondary airstream into the furnace firebox, the primary and secondary airstreams composing the air for combustion, and combusting the coal to yield a flame of combustion, the method for combusting high ash content coal and reducing the amount of ash fines less than one micron in diameter which comprises:
    (a) feeding a pulverized coal which is at least 7 wt % ash into the furnace firebox in the primary airstream, and
    (b) injecting a secondary airstream enriched with a sufficient amount of oxygen via the injection nozzle to afford an oxygen concentration of 22 to 25 vol % in the total air for combustion.

6. The method of claim 5 in which the oxygen enrichment is divided between the primary and the secondary airstreams prior to injection from the nozzle with the secondary airstream containing an amount of oxygen sufficient to provide at least 1 vol % oxygen enrichment in the total air for combustion.

7. The method of claim 6 in which the oxygen enrichment is divided equally between the primary and secondary airstreams.

8. The method of claim 5 in which the pulverized coal has a 10-20 wt % ash content.

9. The method of claim 5 in which the furnace firebox is a utility boiler for generating steam in the production of electricity.

10. The method of claim 6 in which the pulverized coal has a 10-20 wt % ash content.

11. A method for combusting high ash content coal in a furnace comprising a firebox and at least one injection nozzle having a bore for a primary airstream and an annular passage for a secondary airstream, the nozzle communicating with the firebox, which comprises:

(a) injecting a primary airstream containing a pulverized coal which has greater than about 10 wt % ash content and a secondary airstream into the flame zone of the furnace firebox and combusting the coal to yield a flame of combustion, and (b) adding a sufficient amount of oxygen to the secondary airstream such that an oxygen enriched secondary airstream emanates from the injection nozzle and the oxygen concentration of the combined primary and secondary airstreams is 22 to 25, vol % whereby the amount of ash fines less than one micron in diameter is reduced.

12. The method of claim 11 in which the amount of added oxygen is divided between the primary and the secondary airstreams prior to injection from the nozzle with the secondary airstream containing a sufficient amount of added oxygen to provide at least 1 vol % oxygen enrichment in the air of combustion.

13. The method of claim 11 in which the oxygen addition is divided equally between the primary and the secondary airstreams prior to injection from the nozzle.

14. The method of claim 11 in which the pulverized coal has a 10-20 wt % ash content.

15. The method of claim 11 in which the furnace firebox is a utility boiler for generating steam in the production of electricity.

* * * * *